US007856352B2

(12) United States Patent
Godoy et al.

(10) Patent No.: US 7,856,352 B2
(45) Date of Patent: Dec. 21, 2010

(54) METHOD AND SYSTEM OF PRESENTING A DOCUMENT TO A USER

(75) Inventors: Glenn C. Godoy, Endicott, NY (US); Mark A. Musa, Brackney, PA (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 12/110,867

(22) Filed: Apr. 28, 2008

(65) Prior Publication Data
US 2008/0270108 A1 Oct. 30, 2008

Related U.S. Application Data

(63) Continuation of application No. 09/947,896, filed on Sep. 6, 2001, now Pat. No. 7,392,173.

(51) Int. Cl.
*G06F 17/27* (2006.01)
*G06F 17/20* (2006.01)

(52) U.S. Cl. .............................................. 704/9; 704/8

(58) Field of Classification Search ................ 704/8, 704/9
See application file for complete search history.

(56) References Cited

U.S. PATENT DOCUMENTS

| | | | |
|---|---|---|---|
| 5,523,946 A | 6/1996 | Kaplan et al. | |
| 5,787,386 A | 7/1998 | Kaplan et al. | |
| 5,870,749 A | 2/1999 | Adusumilli | |
| 5,884,247 A | 3/1999 | Christy | |

(Continued)

FOREIGN PATENT DOCUMENTS

EP 0 926 604 A2 6/1999

(Continued)

OTHER PUBLICATIONS

"Language Translating Browser", Research Disclosure, Apr. 1999/569, Disclosed by International Business Machines Corporation 420120.

*Primary Examiner*—Michael N Opsasnick
(74) *Attorney, Agent, or Firm*—Scully, Scott, Murphy & Presser, P.C.; William Schiesser

(57) ABSTRACT

A method and system for presenting a document to a user. The method comprises the steps of providing a plurality of documents having one or more language translations; specifying a preferred order of languages for the user; and when the user requests a search term, searching the plurality of documents for those that contain the search term. The method comprises the further steps of matching the language translations of the documents containing the search term with the preferred order of languages for the user; and delivering, for each of the documents containing the search term, a best match language translation to the user. With the preferred embodiment of the invention, the following functionalities are enabled: (1) Present to the user his preferred translation or a default translation if the preferred has not yet been made available to the system; (2) Present to the user the "best available" translation, given an order of preference, or a default translation if none of the "better" translations are available; and (3) Present to the user the "best available" translation using a user's specified preference, or, if none of those translations are available, the "best available" according to a system level specified preference.

4 Claims, 12 Drawing Sheets

U.S. PATENT DOCUMENTS

| | | | |
|---|---|---|---|
| 6,092,035 A | 7/2000 | Kurachi et al. | |
| 6,212,537 B1* | 4/2001 | Nosohara | 715/264 |
| 6,347,316 B1* | 2/2002 | Redpath | 1/1 |
| 6,370,498 B1* | 4/2002 | Flores et al. | 704/3 |
| 6,381,598 B1* | 4/2002 | Williamowski et al. | 704/1 |
| 6,604,101 B1* | 8/2003 | Chan et al. | 707/706 |
| 6,623,529 B1* | 9/2003 | Lakritz | 715/205 |
| 6,654,717 B2* | 11/2003 | Loofbourrow et al. | 704/9 |
| 6,839,742 B1 | 1/2005 | Dyer et al. | |
| 6,883,142 B2 | 4/2005 | Shimamoto et al. | |
| 2001/0044726 A1* | 11/2001 | Li et al. | 704/277 |
| 2002/0143523 A1* | 10/2002 | Balaji et al. | 704/8 |

FOREIGN PATENT DOCUMENTS

| | | |
|---|---|---|
| JP | 11-053365 | 2/1999 |

* cited by examiner

Logical Data Model

Physical Database Design

Figure 4

Object

| Object ID | Object non Lang |
|---|---|
| ObA | 134.23 |
| ObB | 244.34 |

User Group

| User Group Id |
|---|
| Group 1 |
| Group 2 |

Language

| Lang | System Level Prior |
|---|---|
| SP | 1 |
| EN | 2 |
| FR | 2 |
| GR | 4 |

Object with Language

| Object Id | Lang | Object Level Prio | Object Lang Attr |
|---|---|---|---|
| ObA | FR | 1 | French Text |
| ObA | EN | 2 | English Text |
| ObB | GR | 1 | German Text |
| ObB | FR | 2 | French Text |
| ObB | EN | 3 | English Text |

User Group Prio

| User Group Id | Lang | User Grp Level Prio |
|---|---|---|
| Group 1 | FR | 1 |
| Group 1 | EN | 2 |
| Group 2 | SP | 1 |
| Group 3 | GR | 1 |
| Group 3 | EN | 2 |
| Group 3 | FR | 3 |
| Group 4 | GR | 1 |
| Group 4 | SP | 2 |
| Group 4 | FR | 3 |
| Group 5 | GR | 1 |

```
Part I: Preference with default
Select object_key,min(object_level_prio) as bestavail
   From nls.object_with_lang
   Where lang in ('GR','EN')
   Group by object_key
OBJECT
  KEY      BESTAVAIL
 ------    ---------
 ObA           2
 ObB           1
```

Object with Language

| Object Id | Lang | Object Level Prio | Object Lang Attr |
|---|---|---|---|
| ~~ObA~~ | ~~FR~~ | ~~1~~ | ~~French Text~~ |
| ObA | EN | 2 | English Text |
| ObB | GR | 1 | German Text |
| ~~ObB~~ | ~~FR~~ | ~~2~~ | ~~French Text~~ |
| ObB | EN | 3 | English Text |

Figure 5

Function 1

```
--
-- Assumes a default translation is always available and is
-- in one and only one language (eg.EN)
--
Select o.object_key,o.object_lang_attr
From
    -- Preference with default
   (Select object_key,min(object_level_prio) as bestavail
    From nls.object_with_lang
    Where lang in ('GR','EN')
    Group by object_key) as ba
   ,nls.object_with_lang o
Where
    o.lang in ('GR','EN')

and o.object_key=ba.object_key
and o.object_level_prio=ba.bestavail
         OBJECT
OBJECT   LANG
 KEY     ATTR
------   -----------------------------------
ObA      English text
ObB      German text
```

Figure 6

2) Present to the user the 'best available' translation, given an
order of preference, or a default translation if non of the 'better'
translations are available.

French is the default.

Function 2

```
Select
 u.user_group_id,o.object_key,o.object_lang_attr,ba.bestavail,obj.object_non_lang
From
    (Select
       u.user_group_id,min(u.usergrp_level_prio) as bestavail,o.object_key
     From
        nls.object_with_lang o
       ,nls.user_group_prio u
     Where o.lang=u.lang
     Group by o.object_key,u.user_group_id) as ba
   ,nls.object_with_lang o
   ,nls.user_group_prio u
   ,nls.object obj
Where
    o.object_key=ba.object_key
and u.usergrp_level_prio=ba.bestavail
and u.user_group_id=ba.user_group_id
and u.lang=o.lang
and o.object_key=obj.object_key
Union all
Select
 m.user_group_id,o.object_key,o.object_lang_attr,-1 as bestavail,obj.object_non_lang
From
     (Select
        distinct u.user_group_id,o.object_key
      From
        nls.object_with_lang o
       ,nls.user_group_prio u
      Where
        NOT EXISTS (
          Select 1 from
             (Select
                 u.user_group_id,o.object_key
               From
                 nls.object_with_lang o
                ,nls.user_group_prio u
               Where o.lang=u.lang) as ba
            Where ba.user_group_id=u.user_group_id
            and ba.object_key=o.object_key
```

Figure 7

```
    )
  ) as m
,nls.object_with_lang o
,nls.lang u
,nls.object obj
Where
    u.lang='FR'
and m.object_key=o.object_key
and u.lang=o.lang
and o.object_key=obj.object_key
```

| USER GROUP ID | OBJECT KEY | OBJECT LANG ATTR | BESTAVAIL | OBJECT NON LANG |
|---|---|---|---|---|
| Group 1 | ObA | French text | 1 | 134.23 |
| Group 1 | ObB | French text | 1 | 244.34 |
| Group 2 | ObA | French text | -1 | 134.23 |
| Group 2 | ObB | French text | -1 | 244.34 |
| Group 3 | ObA | English text | 2 | 134.23 |
| Group 3 | ObB | German text | 1 | 244.34 |
| Group 4 | ObA | French text | 3 | 134.23 |
| Group 4 | ObB | German text | 1 | 244.34 |
| Group 5 | ObA | French text | -1 | 134.23 |
| Group 5 | ObB | German text | 1 | 244.34 |

Figure 8

3) Present to the user the 'best available' translation using a user's specified preference, or, if none of those translations are availabe, the 'best available' according to a system level specified preference.

Function 3

```
Select
  u.user_group_id,o.object_key,o.object_lang_attr,ba.bestavail,obj.object_non_lang
From
    (Select
       u.user_group_id,min(u.usergrp_level_prio) as bestavail,o.object_key
     From
        nls.object_with_lang o
        ,nls.user_group_prio u
     Where o.lang=u.lang
     Group by o.object_key,u.user_group_id) as ba
  ,nls.object_with_lang o
  ,nls.user_group_prio u
  ,nls.object obj
Where
    o.object_key=ba.object_key
and u.usergrp_level_prio=ba.bestavail
and u.user_group_id=ba.user_group_id
and u.lang=o.lang
and o.object_key=obj.object_key
```

```
Union all
Select
  m.user_group_id,o.object_key,o.object_lang_attr,bsa.bestavail,object_non_lang
From
    (Select
        distinct u.user_group_id,o.object_key
     From
       nls.object_with_lang o
       ,nls.user_group_prio u
     Where
       NOT EXISTS (
         Select 1 from
             (Select
                 u.user_group_id,o.object_key
              From
                nls.object_with_lang o
                ,nls.user_group_prio u
              Where o.lang=u.lang) as ba
          Where ba.user_group_id=u.user_group_id
          and ba.object_key=o.object_key
       )
    ) as m
    (Select
        min(u.system_level_prio) as bestavail,o.object_key
     From
       nls.object_with_lang o
       ,nls.lang u
     Where o.lang=u.lang
     Group by o.object_key) as bsa
   ,nls.object_with_lang o
   ,nls.lang u
   ,nls.object obj
Where
    o.object_key=bsa.object_key
and m.object_key=o.object_key
and u.system_level_prio=bsa.bestavail
and u.lang=o.lang
and o.object_key=obj.object_key
```

| USER GROUP ID | OBJECT KEY | OBJECT LANG ATTR | BESTAVAIL | OBJECT NON LANG |
|---|---|---|---|---|
| Group 1 | ObA | French text | 1 | 134.23 |
| Group 1 | ObB | French text | 1 | 244.34 |
| Group 2 | ObA | English text | 2 | 134.23 |
| Group 2 | ObB | English text | 2 | 244.34 |
| Group 3 | ObA | English text | 2 | 134.23 |
| Group 3 | ObB | German text | 1 | 244.34 |
| Group 4 | ObA | French text | 3 | 134.23 |
| Group 4 | ObB | German text | 1 | 244.34 |
| Group 5 | ObA | English text | 2 | 134.23 |
| Group 5 | ObB | German text | 1 | 244.34 |

Code Sample 1: Complex - Two descriptions requiring the 'best match translation'

```
if (!initialEntry) {
    if (!SelectedERP.equals("ALL")) {
        WhereClause=true;
        WhereERP = appProp.getNamedProperty
("common","InstAppDomVal_Get_WhereERP").trim();
    }
// when returning from CopySet, SelectedType may be "empty"
    if (!SelectedType.equals("ALL") && !SelectedType.equals
("empty")) {
        WhereClause=true;
        WhereType = appProp.getNamedProperty
("common","InstAppDomVal_Get_WhereType").trim();
    }
    if (!CodeValue.equals("")) {
        WhereClause=true;
        WhereCodeValue = appProp.getNamedProperty
("common","InstAppDomVal_Get_WhereCodeValue").trim();
    }

String SearchQuery = appProp.getNamedProperty
("common","InstAppDomVal_Get_View").trim();
        String SearchOrder = appProp.getNamedProperty
("common","InstAppDomVal_Get_ViewOrder").trim();
        if (WhereClause) {
            WhereQuery = " " + WhereERP + " " + WhereType + " " +
WhereCodeValue;
            SearchQuery = SearchQuery + " " + WhereQuery;
        }
        SearchQuery = SearchQuery + " " + SearchOrder;

/* SQL Statement being executed, modified with specific sample 'where
clause' and result set.
--
-- Sample for descriptions in French Canadian or the default (English in
this case)
-- and for the domain set of values known as PO_TERMDESC_CD
--
select
    a.instappl_id
    , SUBSTR(george.lang_iadom_desc,1,20) as lang_iadom_desc
    , a.domval_cd
    , SUBSTR(a.lang_domval_desc,1,20) as lang_domval_desc
    , a.dom_id
from
    -- Answer set 1: Select all Application specific domain values
    pes.vlinstappl_domvalu a,
    -- Answer set 2: Find the best available translation for Application
specific domain value descriptions
    (Select instappl_id,dom_id,domval_cd,min(language_prefer_cd) as
language_prefer_cd
    from
        pes.vlinstappl_domvalu
```

Figure 11

```
Where
   (language_cd = 'frCA' or language_prefer_cd = '02')
   group by instappl_id,dom_id,domval_cd) as b,
– Answer set 3: Select the Application specific domain description
using the best available translation
  (select a.dom_id, a.lang_iadom_desc
   from
     pes.tlinstappl_domain a,
     – Find the best available translation for Application specific
domain descriptions.
    (Select dom_id,min(language_prefer_cd) as language_prefer_cd
     from
       pes.tlinstappl_domain
       Where (language_cd = 'frCA' or language_prefer_cd = '02')
       group by dom_id) as b
    where
       a.dom_id=b.dom_id
       and (a.language_cd= 'frCA' or a.language_prefer_cd='02')
       and a.language_prefer_cd=b.language_prefer_cd) as george
where
– limit Answer set 1 to the best availabe translations found in Answer set
2
    a.instappl_id=b.instappl_id
and a.dom_id=b.dom_id
and a.domval_cd=b.domval_cd
and (a.language_cd= 'frCA' or a.language_prefer_cd='02')
– Join Answer set 1 and 3 to associate the Domain Description with each
Domain Value
– description in that domain.
and a.language_prefer_cd=b.language_prefer_cd.
and george.dom_id=a.dom_id
– Limit all answer sets to the domain 'PO_TERMDESC_CD'
and a.dom_id='PO_TERMDESC_CD'

A portion of the answer set follows. Notice that the desired French
Canadian is presented
when available and English (the default) when French Canadian translations
were not found.
Only English was found for the Domain Description (LANG_IADOM_DESC) and a
mixture of
the two languages was found for the Domain Value Description
(LANG_DOMVAL_DESC).

INSTAPPL_ID   LANG_IADOM_DESC    DOMVAL_CD         LANG_DOMVAL_DESC
DOM_ID
```

Figure 12

| | | | |
|---|---|---|---|
| IBMEDXTST PO_TERMDESC_CD | Payment Terms | 05 | 5 Days from Date of |
| IBMEDXTST PO_TERMDESC_CD | Payment Terms | 15 | 15 Days from Date of |
| IBMEDXTST PO_TERMDESC_CD | Payment Terms | 21 | Union Microclean |
| IBMEDXTST PO_TERMDESC_CD | Payment Terms | 30 | 30 Days from Date of |
| IBMEDXTST PO_TERMDESC_CD | Payment Terms | 45 | 45 Days from Date of |
| IBMEDXTST PO_TERMDESC_CD | Payment Terms | 60 | 60 Days from Date of |
| IBMEDXTST PO_TERMDESC_CD | Payment Terms | 90 | 90 Days from Date of |
| IBMSAPGC1 PO_TERMDESC_CD | Payment Terms | BD00 | Rabais de 1/2 % si p |
| IBMSAPGC1 PO_TERMDESC_CD | Payment Terms | BE00 | Rabais de 1/2 % si p | end of SQL Statement sample and result set */

```
        pstmt = con.prepareStatement(SearchQuery);
        pstmt.setString(1,locale);
        pstmt.setString(2,locale);
        pstmt.setString(3,locale);
        pstmt.setString(4,locale);

if (WhereClause) {
            int i=5;
            if (WhereERP.length() > 0) {
                pstmt.setString(i,SelectedERP);
                i++;
            }
            if (WhereType.length() > 0) {
                pstmt.setString(i,SelectedType);
                i++;
            }
            if (WhereCodeValue.length() > 0) {
                pstmt.setString(i,"%" + CodeValue + "%");
                i++,
            }
        } rs = pstmt.executeQuery();
        SearchUtilResults sur = new SearchUtilResults(rs, count+1, limit).

rs.close();    // close RS and statement;
        pstmt.close().
```

Figure 13

Code Sample 2: Simpler - Single description requiring the 'best match translation'

```
// ELEMENT 0 . Map of Code types & descriptions
/* SQL Statement being executed, modified with specific sample 'where
clause' and result set.

Select g.dom_id,g.lang_iadom_desc
from
    -- Answer set 1: Select all Application specific domain descriptions
    PeS.VLInstAppl_Domain g
    -- Answer set 2: Find the best available translation for Application
specific domain descriptions
    ,(Select dom_id,min(language_prefer_cd) as language_prefer_cd
        from PeS.VLInstAppl_Domain
        Where (language_cd = 'frCA' or language_prefer_cd = '02')
        group by dom_id) as al Where
    (g.language_cd = 'frCA' or g.language_prefer_cd='02')
    and g.language_prefer_cd=al.language_prefer_cd
    and g.dom_id=al.dom_id DOM_ID              LANG_IADOM_DESC
    ─────────────       ─────────────────
    INVPSTDC_ROLE_CD    Invoice posting document roles
    INVPSTDC_TYPE_CD    Invoice posting document types
    INV_TYPE_CD         Invoice type end of SQL Statement being executed */
    pstmt = con.prepareStatement(appProp.getNamedProperty ("common","InstAppDomVal_Get_InstAppDomain").trim());
    pstmt.setString(1,lang);
    pstmt.setString(2,lang);
    rs = pstmt.executeQuery();
    tmpMap = new HashMap();
// each pair becomes an element of the hashtable
    while (rs.next()) {
        tmpMap.put((rs.getString(1)).trim(),(rs.getString(2)).trim());
    } retV.addElement(tmpMap);
    rs.close();
    pstmt.close();
```

Figure 14

METHOD AND SYSTEM OF PRESENTING A DOCUMENT TO A USER

CROSS REFERENCE TO RELATED APPLICATION:

The present application is a continuation of U.S. Ser. No. 09/947,896, filed Sep. 6, 2001.

BACKGROUND OF THE INVENTION

1. Field of the Invention

This invention generally relates to identifying and presenting documents from computer databases. More specifically, the invention relates to methods and systems for determining which language in which to present a document when the document is available in more than one language.

2. Prior Art

Over the last several years, the amount of material accessible by computer searching and the geographic reach of computer searching, particularly via the Internet, have both grown enormously. As a result, today, many documents that can be accessed are actually available in several languages. Prior art searching systems, however, do not provide any systematic procedure for determining which language to present or deliver a document when the document is available in more than one language. Moreover, with many searching systems, if a document is not available in a particular language (commonly the searcher's home language), the document is not identified at all, and the searcher does not even become aware of its availability.

SUMMARY OF THE INVENTION

An object of this invention is to improve methods and systems for presenting documents identified through a computer search.

Another object of the present invention is to provide a procedure for determining the language in which to present a document when the document is available in more than one language.

A further object of the invention is to allow a document searching application to continue a document search even though the preferred language is not available for a given object.

These and other objectives are attained with a method and system for presenting a document to a user. The method comprises the steps of providing a plurality of documents having one or more language translations; specifying a preferred order of languages for the user; and when the user requests a search term, searching the plurality of documents for those documents that contain the search term. The method comprises the further steps of matching the language translations of the documents containing the search term with the preferred order of languages for the user; and delivering, for each of the documents containing the search term, a best match language translation to the user.

With the preferred embodiment of the invention, the following functionalities are enabled:

1. Present to the user his preferred translation or a default translation if the preferred has not yet been made available to the system.
2. Present to the user the "best available" translation, given an order of preference, or a default translation if none of the "better" translations are available.
3. Present to the user the "best available" translation using a user's specified preference, or, if none of those translations are available, the "best available" according to a system level specified preference.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 is a table providing sample data used to demonstrate the capabilities of this invention.

FIG. 5 shows a first part of a procedure for presenting a translation to a user according to a first capability of this invention.

FIG. 6 shows the second part of the procedure for presenting the translation to the user according to the first capability of the invention.

FIGS. 7 and 8 show a program for presenting the translation to the user according to the second capability of this invention.

FIGS. 9 and 10 show a program for presenting the translation to the user according to a third capability of the present invention.

FIGS. 11-13 show a first program that may be used to implement this invention.

FIG. 14 shows a second program that may be used to carry out the invention.

DETAILED DESCRIPTION OF THE PREFERRED EMBODIMENTS

Figure 1:
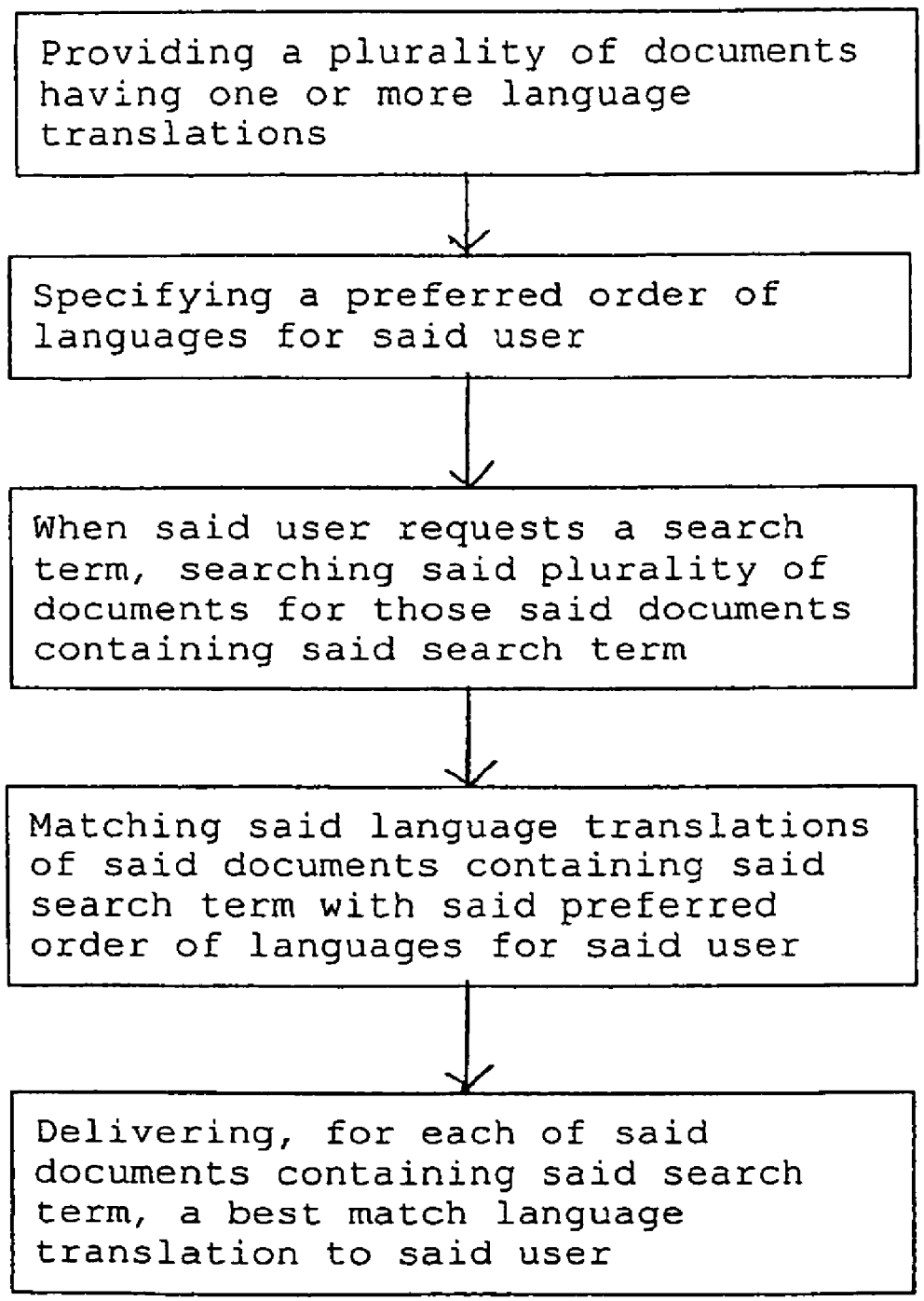
FIG. 1 generally outlines a preferred method embodying the present invention.

This invention, generally, relates to a method and system for presenting a document to a user. With reference to FIG. 1, the method comprises the steps of providing a plurality of documents having one or more language translations, and specifying a preferred order of languages for the user. When the user requests a search term, the plurality of documents are searched for those documents that contain the search term. The language translations of the documents that contain the search term are matched with the preferred order of languages for the user; and for each of the documents that contain the search term, a best match language translation is delivered to the user.

The preferred embodiment of the invention employs several mechanisms:

1. Textual or descriptive data which requires translation to needed languages;
2. Separation of language sensitive data from metric data;
3. An optional default translation; and
4. A language preference measurement which specifies the priority in which available translations are to be presented to the end-user.

Textual or descriptive data which requires translations to needed languages are referred to herein as "language sensitive data." These attributes (like Product Description, Help Text, Code Value Long Name) are members of entities or objects which often contain other data which is not sensitive to language such as metric, monetary or codified data. Data which is not sensitive to language are referred to herein as metric data. Attributes such as Product Price or Unit of Measure are examples of this kind of data. There may be many objects in the system which embody data which requires translation. In the following logical model, the attribute "Object Language Attribute" is a sample of language sensitive data, and "Object Non-Language Attribute" is not.

The separation of language sensitive data from metric data is not necessary to the practice of the invention in its broadest sense, but does provide a higher level of data normalization, protecting metric data from update anomalies and redundancy. Using this separation, data such as Product Price will be stored only once, regardless of the number of translations available for its related textual data such as Product Description. This concept is shown in the logical model as the entity "Object" which contains metric data, and "Object with Language" which contains language sensitive data.

An optional default translation allows for a simple retrieval scheme to obtain some translation if the preferred language has not been made available. For example, because it is the most universally spoken language, an English translation of all textual data could be made available for all language sensitive data. In the following model, the entity "Object with Language" would house a default translation for every instance of "Object" identified by "Object_ld".

The language preference measurement, as mentioned above, specifies the priority in which available translations are to be presented to the end-user. This weighting factor can be controlled at several levels within the system. For example, this factor can be a system level language prioritization, an object level language prioritization, or a user or user group specified language preference measurement.

System level language prioritization requires a weighting of every language which may be present in the system. This level of control implies that all users of the system will see the same available translations. For example, if the system level preference is to see French first, then Spanish, then English if available and one piece of data has Spanish only, then all users of the system will see the Spanish translation.

Object level language prioritization requires a weighting of each object whose language sensitive data is stored within the system. Examples of an object are Catalog, Product, Contract, Manufacturing Operation and so on. Each of these objects may specify its own preference. An object may also choose to denormalize the System level preference, storing that preference with its language sensitive data.

A user or user group specified language preference measurement. This data specifies the priority in which available translations are to be presented to the end-user. For example, one user may prefer French, Spanish, if French is not available, or English if Spanish is also not available. This level of control may be designed for a variety of "user" or "user organization" levels. For example, a "person specific" implementation would allow individual specification of language preference. This may be contrasted with a "department specific" implementation which would allow those persons who are members of the same department to share a common language preference specification. Other, more generic design might be made in addition to business organizations. The following model allows for such a generic grouping through the use of a "User Group" which would eventually be associated to a person through some relational means.

Figure 2:
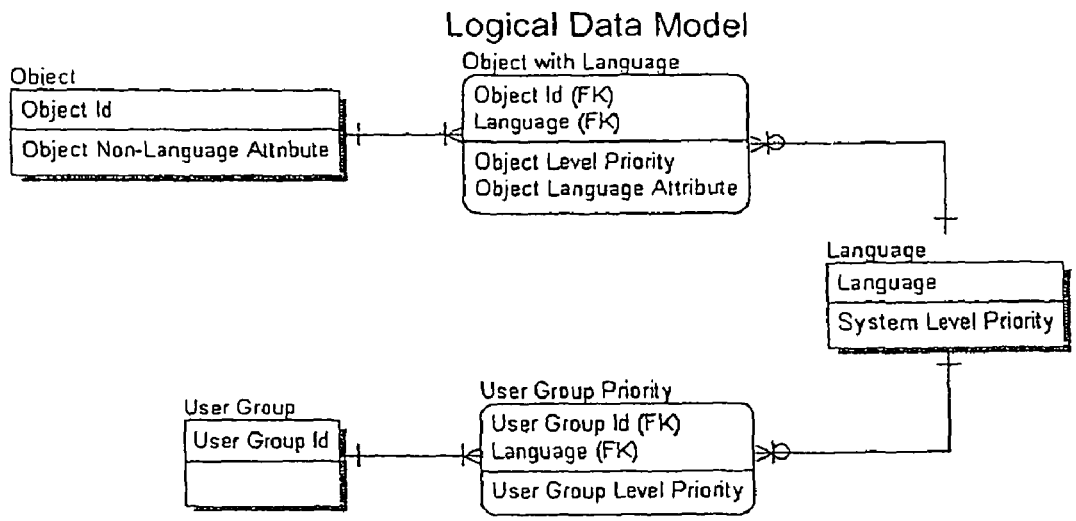
FIG. 2 shows a logical data model that may be used to implement the invention.

These mechanisms may be employed in a physical implementation of the logical data model shown in FIG. 2. This model is the basis for the technical details and examples described below.

As a result of the use of the above-discussed mechanisms, several functionalities are enabled. One functionality is to present to the user his preferred translation, or a default translation if the preferred has not yet been made available to the system. Another functionality is to present to the user the "best available" translation, given an order of preference, or a default translation if none of the "better" translations are available. A third functionality is to present to the user the "best available" translation using a user's specified preference, or if none of those translations are available, the "best available" according to a system level specified preference.

Figure 3:
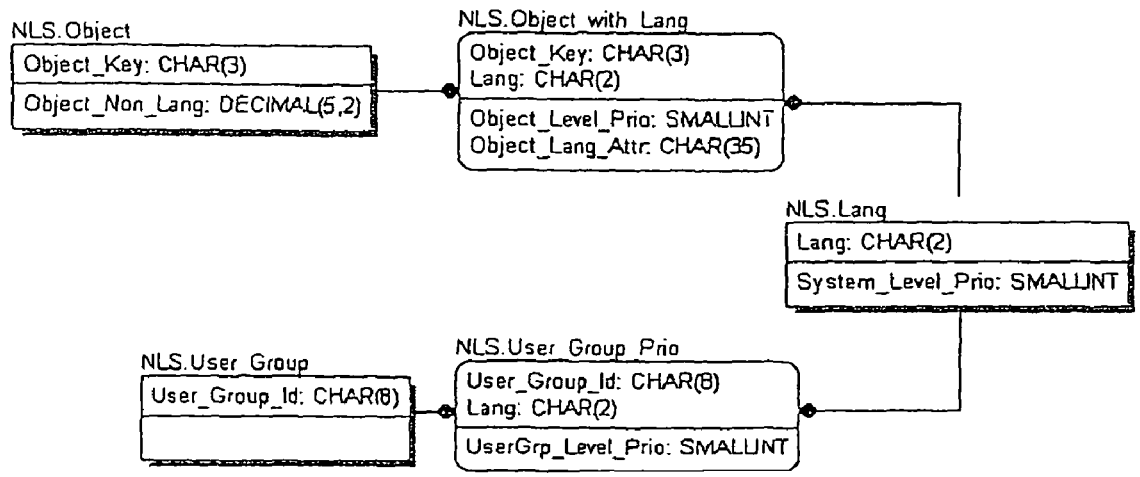
FIG. 3 shows the objects in which a language preference may be specified.

The user of relational technology, such as that found in the database manager software DB2, allows for the design of table pairs which will house the "Object/Object with Language". The design would also implement the "preference" mechanism in any table deemed necessary. With reference to FIG. 3, in the following example, language preference is specified:

1. at the System Level via the System_Level_Prio column in table NLS.Lang
2. at an Object Level via the Object_Level_Prio column in table NLS.Object_with_Lang
3. at a User Level via the UserGrp_Level_Prio column in the table NLS.User_Group_Prio Specific examples of these capabilities are given below, and sample data used to demonstrate these capabilities are shown in FIG. 4.

A first capability of this invention, as mentioned above, is to present to the user his preferred translation or a default translation if the preferred has not yet been made available to the system.

This capability operates when given a preferred language (e.g. "GR") and the expected default language (e.g. "EN"). The follow discussed SQL has been broken into two parts to show its operation. Part I, shown in FIG. 5, is used to obtain the best available language by preference level. The results of running Part I against the sample data is included. Refer to the "Object with Language" sample data shown in FIG. 4.

This statement uses the object level preference and looks for a stated preferred language (i.e. German) and specifies the default language as English (EN). The answer set reveals that Object A has a best preference of 2 (whose language is unknown, but it is either German or English). The sample data included shows those rows eliminated by the "where clause" of "GR" and "EN" (those languages which are not either of those have been crossed out). The shaded background indicates the "best" or minimum preference available for each object.

If the preferred language had been French (FR), then best available would be inverted (e.g. ObA 1 and ObB 2) because French is available for ObA and not ObB. If Spanish (SP) had been specified, the preferences would have been ObA as 2 and ObB as 3 because Spanish is not available at all, and English has two different preference levels stated based on the Object.

The answer set form Part I is included in the SQL statement shown in FIG. 6, which now obtains the actual translated text for each row from Part I. Joining the subselect (Part I) to the nls.object_with_lang_table allows for EN when it is the only language available (other than German), but ferrots out EN when 01 is available for the desired language.

FIGS. 7 and 8 show a program for the second capability of the preferred embodiment of the invention, which is to present the user the "best available" translation, given an order of preference, or a default translation if none of the "better" translations are available. FIGS. 9 and 10 provide a program for the third capability, which is to present to the user the "best available" translation using a user's specified preference, or, if none of those translations are available, the "best available" according to a system level specified preference.

Two code samples that may be used to implement this invention are given in FIGS. 11-13 and FIG. 14. Both of these code samples are written in the Java programming language and employ the use of SQL (Structured Query Language) to obtain data housed in a relational database management system. The sample of FIGS. 11-13 includes two descriptions requiring the "best match translation." The sample code of FIG. 14 includes a single description requiring the "best match translation."

Figure 15:
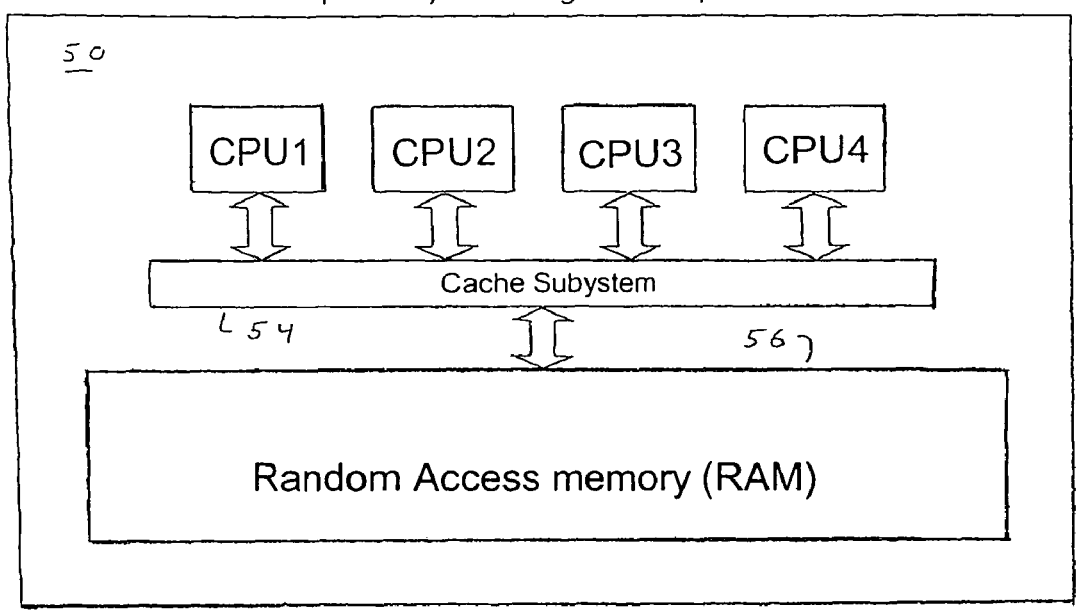
FIG. 15 shows a computer system that may be used in the practice of the invention.
Figure 16:
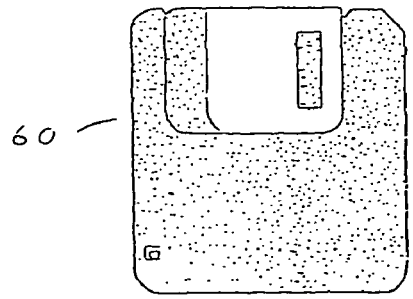
FIG. 16 illustrates a memory medium that can be used to hold a computer program for carrying out this invention.

As will be understood by those skilled in the art, any suitable computing system or apparatus may be used to practice this invention. For example, a suitable computer system illustrated at 50 in FIG. 15 may be used. System 50, generally, comprises a series of CPUs, a cache subsystem 54, and a random access memory (RAM) 56. Also, as will be understood by those skilled in the art, the present invention may be embodied in a computer program storage device (including software embodied in a magnetic, electrical, optical or other storage device). One suitable storage medium is illustrated, for example, at 60 in FIG. 16.

The preferred embodiment of the invention, as described above in detail, provides a number of significant advantages. Among these are improved end user satisfaction, increased application reliability, phased in translation enablement, and a visual clue that the object is available but not translated to the desired language. In addition, the present invention provides a broad and easy to implement solution that has an unlimited preferred language priority specification, and the end user can continue to use the application even though the preferred language is not available for a given object.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

The invention claimed is:

1. A system for presenting a document to a user, comprising:
   a database including a plurality of documents having one or more language translations;
   means for specifying a multitude of sets of language priorities, each of said sets including a given preferred order of languages, and including means for specifying (i) a first set of system level language priorities, (ii) for each of a group of defined documents, an associated second set of object level language priorities, and (iii) a third set of user level language priorities;
   means for searching said plurality of documents, when said user requests a search term, for those said documents containing said search term;
   means for delivering each of said documents that contains the search term and that is one of said group of defined documents, to the user in a language determined by said associated second set of object level language priorities; and
   means for delivering each of said documents that contains the search term and that is not one of said group of defined delivering, to the user in a language determined by said user level language priorities, if said each document is available in one of user level language priorities; and if said each document is not available in any of said user level language priorities, then presenting said each document in the language that is the highest, of the available languages, in said preferred order of languages of the selected one of said sets of language priorities.

2. A system according to claim 1, wherein:
   the means for specifying includes means specifying a default language; and
   the delivery means includes means for presenting the document to the user in the default language, if the document is not available in any of the user level language priorities, and is not available in any of the system level language priorities.

3. A program storage device readable by a computer, tangibly embodying a program of instructions executable by the computer to perform method steps for presenting a document to a user, said method steps comprising:
   providing a plurality of documents having one or more language translations;
   specifying a multitude of sets of language priorities, each of said sets including a given preferred order of languages, including the steps of:
   i) specifying a first set of system level language priorities,
   ii) for each of a group of defined documents, specifying an associated second set of object level language priorities, and
   iii) specifying a third set of user level language priorities;
   when said user requests a search term, searching said plurality of documents for those said documents containing said search term;
   for each of said documents that contains the search term and that is one of said group of defined documents, delivering said each of said documents to the user in a language determined by said associated second set of object level language priorities; and
   for each of said documents that contains the search term and that is not one of said group of defined documents, delivering said each of said documents to the user in a language determined by said user level language priorities, if said each document is available in one of user level language priorities; and if said each document is not available in any of said user level language priorities, then presenting said each document in the language that is the highest, of any available languages, in said system level language priorities.

4. A program storage device according to claim 3, wherein:
   the specifying step includes the step of specifying a default language; and
   the delivery step includes the step of, if the document is not available in any of the user level language priorities, and is not available in any of the system level language priorities, then presenting the document to the user in the default language.

* * * * *